US011736796B1

(12) United States Patent
 Muthiah

(10) Patent No.: US 11,736,796 B1
(45) Date of Patent: Aug. 22, 2023

(54) WORKLOAD TRIGGERED DYNAMIC CAPTURE IN SURVEILLANCE SYSTEMS

(71) Applicant: Western Digital Technologies, Inc., San Jose, CA (US)

(72) Inventor: Ramanathan Muthiah, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/829,479

(22) Filed: Jun. 1, 2022

(51) Int. Cl.
  *H04N 5/77* (2006.01)
  *H04N 23/60* (2023.01)
  *H04N 5/907* (2006.01)
  *H04N 23/51* (2023.01)
  *H04N 23/661* (2023.01)

(52) U.S. Cl.
  CPC ............ *H04N 23/665* (2023.01); *H04N 5/77* (2013.01); *H04N 5/907* (2013.01); *H04N 23/51* (2023.01); *H04N 23/661* (2023.01)

(58) Field of Classification Search
  None
  See application file for complete search history.

(56) References Cited

U.S. PATENT DOCUMENTS

| 8,856,424 | B2 | 10/2014 | Yoon et al. | |
| 9,704,393 | B2 | 7/2017 | Acharya et al. | |
| 2012/0047318 | A1* | 2/2012 | Yoon | G06F 3/0613 |
| | | | | 711/E12.008 |
| 2016/0366202 | A1 | 12/2016 | Phillips et al. | |

\* cited by examiner

*Primary Examiner* — Daniel T Tekle
(74) *Attorney, Agent, or Firm* — Patent Law Works LLP

(57) ABSTRACT

Systems and methods for managing write stream workload of video surveillance systems through playback workload triggered dynamic capture are described. A video camera may include a video image sensor for receiving video data. The video data may be written to a storage device. A request for access to the video data may then be received. An impact on a standard data write stream may be determined based on the time window determined for the access to the video data. At least one mitigation option may be initiated at the video image sensor as a result.

20 Claims, 7 Drawing Sheets

WORKLOAD TRIGGERED DYNAMIC CAPTURE IN SURVEILLANCE SYSTEMS

TECHNICAL FIELD

The present disclosure generally relates to video surveillance systems and, more particularly, to managing write stream workload of video surveillance systems through workload triggered dynamic capture.

BACKGROUND

Network-based video surveillance systems are a growing computing application in both business and personal markets. Some video surveillance systems may include one or more video cameras communicatively connected to a server, such as a network video recorder, through a wired interface, wired or wireless local area network, or wired or wireless wide area network, such as the internet. As video is recorded by the cameras, it may be forwarded to the server system where it is stored and/or analyzed for subsequent retrieval, and/or it may be forwarded to a storage device stored locally on the camera or on a backup storage device on a connected camera. Client or user systems are communicatively connected to the server system to request, receive, and display streams of recorded video data and/or related alerts and analytics.

Some video surveillance systems may be configured for playback of stored video data. However, surveillance storage drives are optimized to prioritize write cycles of video being recorded over playback, or read cycles. Issuing data retrieval for playback for incident evaluation purposes for sustained time periods may temporarily affect the write streaming of cameras. Such delays may be substantial for mixed workloads if the onboard resources are tightly coupled to data write rates. Cost-effective surveillance systems that support both access to storage devices that create a workload (e.g., playback or internal storage analytics) and prioritized writes may be needed.

Tuning hardware and resources on a storage device may be advantageous. A reliable way of managing state information on the storage device to enable mixed workloads without data drop out due to cost efficient storage systems may be needed.

SUMMARY

Various aspects for workload triggered dynamic capture in video surveillance systems are described.

One general aspect includes a system that includes a video image sensor and a surveillance controller configured to: receive video data from the video image sensor, wherein the video data includes a video stream of video frames captured by the video image sensor; write the video data to a storage device; receive a request access to the video data; determine a time window for the access to the video data based on a data retrieval of the video data from the storage device; determine an impact on a standard data write stream based on the time window; and initiate, based on the impact on the standard data write stream, at least one mitigation option at the video image sensor.

Implementations may include one or more of the following features. The controller may be further configured to: retrieve a plurality of capture encode options based on past incidents having data write stream impacts; and determine the at least one mitigation option from the plurality of capture encode options based on the impact on the standard data write stream. The system may also be configured where the storage device is one storage device of a plurality of storage devices embedded in a network video recorder (NVR); the NVR comprises the surveillance controller; and the surveillance controller is further configured to determine the impact on the standard data write stream to the storage device based on the plurality of storage devices embedded in the NVR. The system may include the surveillance controller that is further configured to: determine, based on the at least one mitigation option, capture configuration data to lower a bit rate of the video data captured by the video image sensor; and reconfigure, during the time window and using the capture configuration data, video capture through the video image sensor. The system may also be configured where the at least one mitigation option comprises a capture encode option that lowers a resolution of the video frames captured by the video image sensor. The system may also be configured where the at least one mitigation option comprises a capture encode option that lowers a frame rate of the video frames captured by the video image sensor. The system may also be configured where the at least one mitigation option comprises modifying at least one capture encode parameter such that a resultant bit rate of a write data stream to the storage device is lowered. The system may also be configured where the at least one capture encode parameter is selected from a list, the list comprising: frame size; group of pictures; encoding format; codec; and video profile. The system may also be configured where the at least one mitigation option comprises modifying at least one capture encode parameter based on feedback on at least one state of other states of the storage device, the at least one state selected from: health; temperature; garbage collection workload; and capacity. The system may also be configured where the feedback is based on a storage device resources model that tracks information on storage device state information including at least one of: health; temperature; garbage collection workload; and available capacity. The system may also be configured where the at least one mitigation option comprises rearranging at least one activity on the system, the activity including background activity and enhanced post write read activity. The system may also be configured where the request for access to the video data comprises one of: playback of the video data, or execution of analytics involving access to the storage device. The system may also be configured where a video camera housing, wherein the video camera housing encloses: the video image sensor; the surveillance controller; a network interface configured to communicate with a network; and the storage device. The system may also be configured where the storage device is one storage device of a plurality of storage devices embedded in the video camera housing; and the surveillance controller is further configured to determine the impact on the standard data write stream to the storage device based on the plurality of storage devices embedded in the video camera housing.

Another general aspect includes a computer-implemented method, including: receiving video data from a video image sensor, wherein the video data includes a video stream of video frames captured by the video image sensor; writing the video data to a storage device; receiving a request for access to the video data; determining a time window for the access to the video data based on a data retrieval of the video data from the storage device; determining an impact on a standard data write stream based on the time window; and initiating, based on the impact on the standard data write stream, at least one mitigation option at the video image sensor.

Implementations may include one or more of the following features. The computer-implemented method may include retrieving a plurality of capture encode options based on past incidents having data write stream impacts; and determining the at least one mitigation option from the plurality of capture encode options based on the impact on the standard data write stream. The computer-implemented method may include: determining, based on the at least one mitigation option, capture configuration data to lower bit rate of the video data captured by the video image sensor; and reconfiguring, during the time window and using the capture configuration data, video capture through the video image sensor. The computer-implemented method may be further configured where the at least one mitigation option is selected from: lowering a resolution of the video frames captured by the video image sensor; lowering a frame rate of the video frames captured by the video image sensor; and modifying at least one capture encode parameter such that a resultant bit rate of a write data stream to the storage device is lowered. The computer-implemented method may be further configured where the at least one mitigation option comprises modifying at least one capture encode parameter such that a resultant bit rate of a write data stream to the storage device is lowered, the at least one capture encode parameter is selected from a list, the list comprising: frame size; group of pictures; encoding format; codec; and video profile.

Still another general aspect includes a video camera, comprising: a video image sensor; means for receiving video data from the video image sensor, wherein the video data includes a video stream of video frames captured by the video image sensor; means for writing the video data to a storage device; means for receiving a request for access to the video data; means for determining a time window for the access to the video data based on a data retrieval of the video data from the storage device; means for determining an impact on a standard data write stream based on the time window; and means for initiating, based on the impact on the standard data write stream, at least one mitigation option at the video image sensor.

The various embodiments advantageously apply the teachings of computer-based surveillance systems to improve the functionality of such computer systems. The various embodiments include operations to overcome or at least reduce the issues previously encountered in surveillance systems and, accordingly, are more effective and/or cost-efficient than other surveillance systems. That is, the various embodiments disclosed herein include hardware and/or software with functionality to improve mixed workloads of playback, access to a storage device for other purposes, and recording in video surveillance. Accordingly, the embodiments disclosed herein provide various improvements to network-based video surveillance systems.

It should be understood that language used in the present disclosure has been principally selected for readability and instructional purposes, and not to limit the scope of the subject matter disclosed herein.

DETAILED DESCRIPTION

Figure 1:
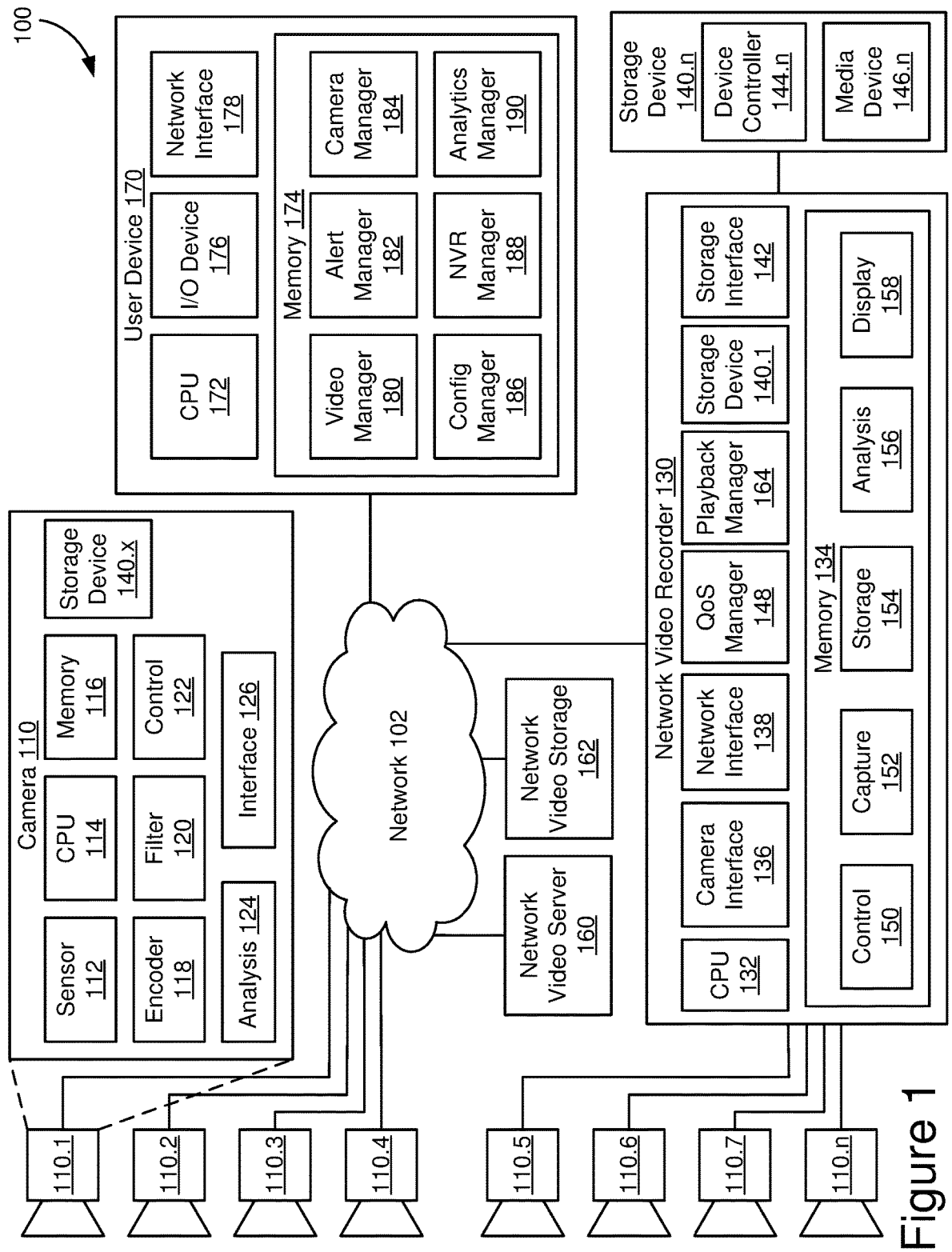
FIG. 1 schematically illustrates an example computer-based surveillance system.

FIG. 1 shows an embodiment of an example video surveillance system 100 with multiple video cameras 110 interconnected to a network video recorder 130 for display of surveillance video on user device 170. While some example features are illustrated, various other features have not been illustrated for the sake of brevity and so as not to obscure pertinent aspects of the example embodiments disclosed herein. In some embodiments, cameras 110, network video recorder 130, and user device 170 are computer-based components that may be interconnected by a network 102. Additional components, such as network video server 160 and/or network video storage 162 may also be connected to network 102. In some embodiments, one or more cameras may connect directly to network video recorder 130, such as cameras 110.5-110.$n$ in FIG. 1, without communicating through network 102. Similarly, in alternate embodiments (not shown), user device 170 may connect directly to network video recorder 130.

In some embodiments, one or more networks 102 may be used to communicatively interconnect various components of surveillance system 100. For example, each component, such as cameras 110, network video recorder 130, external storage device 140.$n$, network video server 160, network video storage 162, and/or user device 170 may include one or more network interfaces and corresponding network protocols for communication over network 102. Network 102 may include a wired and/or wireless network (e.g., public and/or private computer networks in any number and/or configuration) which may be coupled in a suitable way for transferring data. For example, network 102 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, network 102 may comprise a plurality of distinct networks, subnetworks, and/or virtual private networks (VPN) may be used to limit communications among specific components. For example, cameras 110 may be on a limited access network such that video and control data may only be transmitted between cameras 110 and network video recorder 130, enabling network video recorder 130 to control access to cameras 110 and their video data.

Cameras 110 may include analog or digital cameras connected to an encoder that generates an encoded video stream with a defined resolution, aspect ratio, and video encoding format. In some embodiments, cameras 110 may include internet protocol (IP) cameras configured to encode their respective video streams and stream them over network 102 to network video recorder 130. In some embodiments (not shown), the encoder may reside in network video recorder 130. In some embodiments, cameras 110 may be configured to receive audio data through integrated or connected microphones (not shown) and include embedded and/or synchronized audio streams with their respective video streams. In some embodiments, video cameras 110 may include an image sensor 112, a processor or central processing unit CPU 114, a memory 116, an encoder 118, a filter 120, a control circuit 122, and/or a network interface 126. In some embodiments, video cameras 110 may include onboard analytics, such as a video analysis subsystem 124. In some embodiments, video cameras 110 may include at least one storage device 140.x.

For example, image sensor 112 may include a solid state device configured to capture light waves and/or other electromagnetic waves and convert the light into an image, generally composed of colored pixels. Image sensor 112 may determine a base image size, resolution, bandwidth, depth of field, dynamic range, and other parameters of the video image frames captured. Image sensor 112 may include charged couple device (CCD), complementary metal oxide semiconductor (CMOS), and/or other image sensor devices of various sensor sizes and aspect ratios.

Digital video data from image sensor 112 may be received by processor 114 for (temporary) storage and processing in memory 116 and/or encoding by encoder 118. Processor 114 may include any type of conventional processor or microprocessor that interprets and executes instructions. Memory 116 may include a random access memory (RAM) or another type of dynamic storage device that stores information and instructions for execution by processor 114 and/or a read only memory (ROM) or another type of static storage device that stores static information and instructions for use by processor 114 and/or any suitable storage element such as a solid state storage element. Memory 116 may store basic input/output system (BIOS), firmware, and/or operating system instructions for initializing and executing the instructions and processes of cameras 110. Encoder 118 may use various possible digital encoding and/or compression formats for encoding the video stream received by image sensor 112. In some embodiments, encoder 118 may use a compressed video format to reduce the storage size and network bandwidth necessary for storing and transferring the original video stream. For example, encoder 118 may be configured to encode the video data as joint photographic expert group (JPEG), motion picture expert group (MPEG)-2, MPEG-4, advanced video coding (AVC)/H.264, and/or other video encoding standards or proprietary formats.

In some embodiments, one or more infrared (IR) blocking filters 120 may be selectively enabled to reduce the spectrum of light received by image sensor 112. For example, image sensor 112 may have a CCD sensor bandwidth of 400 nanometers (nm) to 1200 nm. Visible light may be 400-700 nm and near IR may be 700-1200 nm. IR blocking filter 120 may be enabled to reduce the bandwidth of the light received by image sensor 112 to the 400-700 nm range, i.e., visible light. When IR blocking filter 120 is disabled, image sensor 112 may capture the full spectrum of 400-1200 nm in video data. IR blocking filter 120 may be configured to block wavelengths above an upper limit of the visible light spectrum, generally 700-750 nm, to the upper limit of image sensor 112 itself, such as 1200-1400 nm.

Control circuit 122 may include a control circuit for managing the physical position of a camera 110. In some embodiments, camera 110 may be a pan-tilt-zoom (PTZ) camera that is capable of remote directional and zoom control. Control circuit 122 may be configured to receive motion commands through network interface 126 and/or through another interface, such as a dedicated remote-control interface, such short distance infrared signals, Bluetooth, etc. For example, network video recorder 130 and/or user device 170 may be configured to send PTZ commands to control circuit 122, which translates those commands into motor control signals for a plurality of actuators that control the position of camera 110. In some embodiments, control circuit 122 may include logic for automatically responding to movement detected through image sensor 112 to redirect camera 110 toward the source of movement. For example, an auto tracking feature may be embodied in firmware that enables the camera to estimate the size and position of an object based on changes in the pixels in the raw video stream from image sensor 112 and adjust the position of the camera to follow the moving object, returning to a default position when movement is no longer detected. In some embodiments, control circuit 122 may include logic for virtual PTZ or ePTZ, which enables a high-resolution camera to digitally zoom and pan to portions of the image collected by image sensor 112, with no physical movement of the camera. In some embodiments, control circuit 122 may include software and one or more application protocol interfaces (APIs) for enabling remote devices to control additional features and capabilities of camera 110. For example, control circuit 122 may enable network video recorder 130 and/or user device 170 to configure video formats, enable and disable filter 120, set motion detection, auto tracking, and similar features, and/or initiate video data streaming.

In some embodiments, video camera 110 may include video analysis subsystem 124 configured for onboard video analytics. For example, video analysis subsystem 124 may be configured to use CPU 114 and memory 116 to execute at least a portion of video analytics for video data captured by video camera 110. In some embodiments, video analysis subsystem 124 may be configured to operate similarly to video analysis subsystem 156 in network video recorder 130, as further described below, and embody one or more analytics engines and/or analytical model libraries.

Network interface 126 may include one or more wired or wireless connections to network 102 and/or a dedicated camera interface of network video recorder 130. For example, network interface 126 may include an ethernet jack and corresponding protocols for IP communication with network video recorder 130. In some embodiments, network interface 126 may include a power over ethernet (PoE) connection with network video recorder 130 or another camera access point. PoE may enable both power for camera 110 and network data to travel on the same wire. In some embodiments, network interface 126 may enable an IP camera to be configured as a network resource with an IP address that is accessible on a LAN, WAN, or the internet. For example, network video recorder 130 and/or user device 170 may be configured to selectively receive video from cameras 110 from any internet-connected location using internet addressing and security protocols.

Network video recorder 130 may include a computer system configured as a video storage device to record the video streams from cameras 110. For example, network video recorder 130 may be configured to receive video streams from each of cameras 110 for storage, analysis, and/or display through user device 170. In some embodiments, cameras 110 may send encoded video streams based on the raw image data collected from their respective image sensors 112, with or without video data compression. A single video stream may be received from each camera 110 and network video recorder 130 may be configured to receive video streams from all connected cameras in parallel, as network bandwidth and processing resources allow.

Network video recorder 130 may include a housing and a bus interconnecting at least one processor or CPU 132, at least one memory 134, at least one storage device 140, and at least one interface, such as camera interface 136, network interface 138, and/or storage interface 142. The housing (not shown) may include an enclosure for mounting the various subcomponents of network video recorder 130, locating any physical connectors for the interfaces, and protecting the subcomponents. Some housings may be configured for mounting within a rack system. The bus (not shown) may include one or more conductors that permit communication among the components of network video recorder 130. Processor 132 may include any type of processor or microprocessor that interprets and executes instructions or operations. Memory 134 may include a random access memory (RAM) or another type of dynamic storage device that stores information and instructions for execution by processor 132 and/or a read only memory (ROM) or another type of static storage device that stores static information and instructions for use by processor 132 and/or any suitable storage element.

In some embodiments, network video recorder 130 may include camera interface 136 configured for connection with one or more cameras 110. For example, camera interface 136 may include a plurality of ethernet ports and supporting protocols compatible with PoE standards for connecting to cameras 110.5-110.*n*. In some embodiments, camera interface 136 may include a PoE network switch for providing power to connected cameras and routing data packets to and from cameras 110.5-110.*n*, such as control and video data. In some embodiments, network video recorder 130 may not include a dedicated camera interface 136 and may use network interface 138 for communication with cameras 110 over network 102.

Network interface 138 may include one or more wired or wireless network connections to network 102. Network interface 138 may include a physical interface, such as an ethernet port, and related hardware and software protocols for communication over network 102, such as a network interface card.

Storage devices 140 may include one or more non-volatile memory devices configured to store video data, such as a hard disk drive (HDD) or solid state drive (SSD). In some embodiments, storage device 140 is, or includes, a plurality of solid-state drives (SSDs). In some embodiments, network video recorder 130 may include internal storage device 140.1 and expandable storage that enables additional storage devices 140.*n* to be connected via storage interface 142. Each storage device 140 may include a non-volatile memory (NVM) or device controller 144 based on compute resources (processor and memory) and a plurality of NVM or media devices 146 for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, storage devices 140 may each be packaged in a housing, such as a multi-part sealed housing with a defined form factor and ports and/or connectors for interconnecting with storage interface 142. Storage device 140.1 and each expanded storage devices 140.*n* may be of the same storage device type or a different storage device type. In some embodiments, video camera 110 may include a storage device 140.*x* configured for onboard video storage.

In some embodiments, a respective data storage device 140 may include a single medium device, while in other embodiments the respective data storage device 140 includes a plurality of media devices. In some embodiments, media devices include NAND-type flash memory or NOR-type flash memory. In some embodiments, storage device 140 may include one or more hard disk drives (HDDs). In some embodiments, storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 140 includes a device controller 144, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 146 are coupled to device controllers 144 through connections that typically convey commands in addition to data, and optionally convey metadata, error correction information and/or other information in addition to data values to be stored in media devices and data values read from media devices 146. Media devices 146 may include any number (i.e., one or more) of memory devices including, without limitation, non-volatile semiconductor memory devices, such as flash memory device(s). In some embodiments, media devices 146 may include NAND or NOR flash memory devices comprised of single level cells (SLC), multiple level cell (MLC), or triple-level cells.

In some embodiments, media devices 146 in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, video media files, or other logical data constructs composed of multiple host blocks. In some embodiments, storage device 140 may be configured specifically for managing the storage and overwriting of video data in a continual monitoring application for video surveillance.

Storage interface 142 may include a physical interface for connecting to one or more external storage devices using an interface protocol that supports storage device access. For example, storage interface 142 may include a peripheral component interconnect express (PCIe), serial advanced technology attachment (SATA), small computer system interface (SCSI), serial attached SCSI (SAS), universal serial bus (USB), Firewire, or similar storage interface connector supporting storage protocol access to storage devices 140.n. In some embodiments, storage interface 142 may include a wireless data connection with sufficient bandwidth for video data transfer. Depending on the configuration and protocols used by storage interface 142, storage device 140.n may include a corresponding interface adapter, firmware, and/or protocols for receiving, managing, and responding to storage commands from network video recorder 130.

Network video recorder 130 may include a plurality of modules or subsystems that are stored and/or instantiated in memory 134 for execution by processor 132 as instructions or operations. For example, memory 134 may include a camera control subsystem 150 configured to control cameras 110. Memory 134 may include a video capture subsystem 152 configured to receive video streams from cameras 110. Memory 134 may include a video storage subsystem 154 configured to store received video data in storage device(s) 140 and/or network video storage 162. Memory 134 may include a video analysis subsystem configured to analyze video streams and/or video data for defined events, such as motion, recognized objects, recognized faces, and combinations thereof. Memory 134 may include a video display subsystem configured to selectively display video streams on user device 170, which may be attached to network video recorder 130 or remotely connected via network 102.

In some embodiments, camera control subsystem 150 may include interface protocols and a set of functions and parameters for using, configuring, communicating with, and providing command messages to cameras 110. For example, camera control subsystem 150 may include an API and command set for interacting with control circuit 122 to access one or more camera functions. In some embodiments, camera control subsystem 150 may be configured to set video configuration parameters for image sensor 112 and/or video encoder 118, manage IR blocking filter 120, access pan-tilt-zoom features of control circuit 122, set or modify camera-based motion detection, tripwire, and/or low light detection parameters in memory 116, and/or otherwise manage operation of cameras 110. For example, camera control subsystem 150 may maintain a video camera configuration table, pages, or similar data structures that includes entries for each video camera being managed and their respective camera-specific configuration parameters, active control features (such as PTZ control), and other configuration and control information for managing cameras 110. In some embodiments, each camera 110 may be assigned a unique camera identifier that may be used by camera control subsystem 150, video capture subsystem 152, and/or other subsystems to associate video data with the camera from which it was received.

In some embodiments, video capture subsystem 152 may include interface protocols and a set of functions and parameters for receiving video streams from cameras 110. For example, video capture subsystem 152 may include video data channels and related data buffers for managing a plurality of camera video data streams. In some embodiments, each video camera 110 may be allocated a dedicated video channel for continuously and/or selectively sending its video stream to network video recorder 130. Video capture subsystem 152 may be configured to pass each received video stream to video storage subsystem 154, video analysis subsystem 156, and/or video display subsystem 158. For example, received video streams may be buffered by video capture subsystem 152 before being streamed to video storage subsystem 154 and split into dual video streams with different video parameters for video analysis subsystem 156 and video display subsystem 158.

In some embodiments, video storage subsystem 154 may include interface protocols and a set of functions and parameters for managing storage of video data in storage devices 140 and/or network video storage 162 for later retrieval and use by video analysis subsystem 156 and/or video display subsystem 158. For example, video storage subsystem 154 may write camera video stream data from video data buffers to non-volatile storage in storage devices 140 and video analysis subsystem 156 and/or video display subsystem 158 may be configured to selectively read video data from storage devices 140. In some embodiments, video storage subsystem 154 may include management of video storage space in storage devices 140 and/or network video storage 162 in accordance with one or more data retention and/or data archiving schemes. For example, surveillance system 100 may support continuous and/or triggered recording of video data from cameras 110 and video storage subsystem 154 may include logic for enforcing a data retention and overwriting policy whereby the fixed storage space of storage devices 140 is recycled for storing a recent period of captured video, video data meeting specific retention criteria, and/or deleting or archiving video data after one or more periods of time defined in the data retention policy. In some embodiments, video storage subsystem 154 may include or access video decoders and/or encoders for storing video data in a storage video format that is different than the camera video format, such as using a different codec, compression factor, frame rate, resolution, image size, etc.

In some embodiments, video analysis subsystem 156 may include interface protocols and a set of functions and parameters for analyzing video data from cameras 110. For example, video analysis subsystem 156 may be configured to run one or more event detection algorithms for determining, tagging, and/or initiating alerts or other actions in response to detected video events. In some embodiments, video analysis subsystem 156 may be configured to tag or build metadata structures that map detected events to time and image location markers for the video stream from which they are detected. For example, video analysis subsystem 156 may use motion, tripwire, object recognition, facial recognition, audio detection, speech recognition, and/or other algorithms to determine events occurring in a video stream and tag them in a corresponding metadata track and/or separate metadata table associated with the video data object. In some embodiments, video streams and/or portions thereof may be tagged with low light condition markers or tags. For example, camera 110 may embed time markers and low light condition tags for video portions captured using low light settings and/or video analysis subsystem 156 may determine a low light condition from the light, color, and/or wavelength bandwidth present in the video data and add appropriate tags. In some embodiments, video analysis subsystem 156 may include event handling logic for determining response to detection of one or more detected events, such as raising an alert to user device 170 or triggering selective display of a video stream including the detected event through video display subsystem 158. In some embodiments, video analysis subsystem 156 may operate in real-time or near real-time on video data received by video capture subsystem 152, delayed processing of video data stored by video storage subsystem 154, and/or a combination thereof based on the nature (and processing requirements) of the video events, volume of video to be processed, and other factors. In some embodiments, video analysis subsystem 156 may comprise one or more analytics engines configured for a particular type of event and corresponding event detection algorithm or model.

In some embodiments, video display subsystem 158 may include interface protocols and a set of functions and parameters for displaying video from video capture subsystem 152 and/or video storage subsystem 154 on user device 170. For example, video display subsystem 158 may include a monitoring or display configuration for displaying one or more video streams in real-time or near real-time on a graphical user display of user device 170 and/or receive video navigation commands from user device 170 to selectively display stored video data from video storage subsystem 154. In some embodiments, video display subsystem 158 may maintain an index of real-time/near real-time video streams and/or stored or archived video streams that are available for access by user device 170. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Video display subsystem 158 may be configured to support user device 170 when directly attached to network video recorder 130 and/or via network 102 within a LAN, WAN, VPN, or the internet.

In some embodiments, surveillance system 100 may include one or more remote and/or cloud-based resources for supporting the functions of network video recorder 130 and/or user device 170. For example, surveillance system 100 may include a network video server 160 configured to host some, all, or select portions of the functions of network video recorder 130, such as a cloud-based server system. As another example, surveillance system 100 may include network video storage 162 for storing active and/or archived video data, supplementing and/or replacing storage devices 140, such as a cloud-based network attached storage system or distributed storage system. In some embodiments, the majority of functions described above for network video recorder 130 may reside in network video recorder 130 and select functions may be configured to leverage additional resources in network video server 160 and/or network video storage 162. For example, network video server 160 may be configured to support specialized and/or processing intensive event detection algorithms to supplement video analysis subsystem 156 and/or network video storage 162 may be configured to support archiving of inactive video data for longer term storage.

User device 170 may be any suitable computer device, such as a computer, a computer server, a laptop computer, a tablet device, a netbook, an internet kiosk, a personal digital assistant, a mobile phone, a smart phone, a gaming device, or any other computing device. User device 170 is sometimes called a host, client, or client system. In some embodiments, user device 170 may host or instantiate one or more applications for interfacing with surveillance system 100. For example, use device 170 may be a personal computer or mobile device running a surveillance monitoring and management application configured to provide a user interface for network video recorder 130. In some embodiments, user device 170 may be configured to access cameras 110 and/or their respective video streams through network video recorder 130 and/or directly through network 102. In some embodiments, one or more functions of network video recorder 130 may be instantiated in user device 170 and/or one or more functions of user device 170 may be instantiated in network video recorder 130.

User device 170 may include one or more processors or CPUs 172 for executing compute operations or instructions stored in memory 174 for accessing video data and other functions of network video recorder 130 through network 102. In some embodiments, processor 172 may be associated with memory 174 and input/output device 176 for executing both video display operations and surveillance system management operations. Processor 172 may include any type of processor or microprocessor that interprets and executes instructions or operations. Memory 174 may include a random access memory (RAM) or another type of dynamic storage device that stores information and instructions for execution by processor 172 and/or a read only memory (ROM) or another type of static storage device that stores static information and instructions for use by processor 172 and/or any suitable storage element. In some embodiments, user device 170 may allocate a portion of memory 174 and/or another local storage device (in or attached to user device 170) for storing selected video data for user device 170. In some embodiments, user device 170 may include one or more input/output (I/O) devices 176. For example, a graphical display, such as a monitor and/or touch screen display, and/or other user interface components such as a keyboard, a mouse, function buttons, speakers, vibration motor, a track-pad, a pen, voice recognition, biometric mechanisms, and/or any number of supplemental devices to add functionality to user device 170. Network interface 178 may include one or more wired or wireless network connections to network 102. Network interface 178 may include a physical interface, such as an ethernet port, and/or related hardware and software protocols for communication over network 102, such as a network interface card, wireless network adapter, and/or cellular data interface.

User device 170 may include a plurality of modules or subsystems that are stored and/or instantiated in memory 174 for execution by processor 172 as instructions or operations. For example, memory 174 may include a video manager 180 configured to provide a user interface for selectively navigating and displaying real-time, near real-time, and/or stored video streams. Memory 174 may include alert manager 182 configured to provide a user interface for setting, monitoring, and displaying alerts based on video events. Memory 174 may include a camera manager 184 configured to provide a user interface for identifying, configuring, and managing cameras 110. Memory 174 may include a configuration manager 186 to provide a user interface for setting and managing system settings, user access controls, storage options, and other configuration settings for surveillance system 100. Memory 174 may include a network video recorder manager 188 configured to provide a user interface for identifying, configuring, and managing network video recorder 130 and/or multiple network video recorders. Memory 174 may include an analytics manager configured to provide a user interface for selecting, training, and managing event detection algorithms for surveillance system 100.

In some embodiments, video manager 180 may include interface protocols and a set of functions and parameters for navigating and displaying video streams from cameras 110. For example, video manager 180 may include a graphical user interface and interactive controls for displaying lists, tables, thumbnails, or similar interface elements for selecting and displaying video streams for particular cameras, times, locations, and/or events. In some embodiments, video manager 180 may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, video manager 180 may include a data structure summarizing all video data stored in surveillance system 100 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.). In some embodiments, video manager 180 may be configured to interface with video display subsystem 158 and/or storage subsystem 154 for determining and retrieving selected video data.

In some embodiments, alert manager 182 may include interface protocols and a set of functions and parameters for setting, monitoring, and displaying alerts based on video events. For example, the user may define a set of trigger events that generate visual, audible, tactile, and/or notification-based (electronic mail, text message, automated call, etc.) alert to user device 170. In some embodiments, alert manager 182 may include a plurality of preset alert conditions with associated event parameters and allow a user to enable and disable alert types and/or change associated event parameters. In some embodiments, alert manager 182 may be configured to overlay graphical elements representing detected events or event indicators on video streams displayed through video manager 180. For example, detected motion, objects, or faces may be boxed or highlighted, tagged with relevant identifiers, or otherwise indicated in the video playback on user device 170. In some embodiments, alert manager 182 may be configured to interface with video analysis subsystem 156, video capture subsystem 152, and/or directly with cameras 110 for receiving event notifications or parameters.

In some embodiments, camera manager 184 may include interface protocols and a set of functions and parameters for identifying, configuring, and managing cameras 110. Configuration manager 186 may include interface protocols and a set of functions and parameters for setting and managing system settings, user access controls, storage options, and other configuration settings. Network video recorder (NVR) manager 188 may include interface protocols and a set of functions and parameters for identifying, configuring, and managing network video recorder 130. For example, each of camera manager 184, configuration manager 186, and/or NVR manager 188 may include a series of graphical user interfaces for displaying their respective component identifiers and related configuration parameters and enabling the user to view and/or change those parameters for managing surveillance system 100 and its component systems. In some embodiments, camera manager 184, configuration manager 186, and/or NVR manager 188 may provide changes parameters to the effected components, such as camera manager 184 sending camera configuration parameter changes to selected cameras 110, NVR manager 188 sending NVR configuration parameter changes to network video recorder 130, and/or configuration manager 186 sending system configuration parameter changes to all effected components.

In some embodiments, analytics manager 190 may include interface protocols and a set of functions and parameters for selecting, training, and managing event detection algorithms. For example, analytics manager 190 may include a library of event detection algorithms for different event types. In some embodiments, the event detection algorithms may include a set of parameters and/or model weights that are preconfigured based on training data sets processed independent of surveillance system 100. For example, analytics manager 190 may include object detection algorithms for common objects, situations, and camera configurations. In some embodiments, analytics manager 190 may include preconfigured training data sets and/or allow the user to define training data sets for determining or refining event detection algorithm parameters and/or model weights based on predefined base algorithms or models. In some embodiments, analytics manager 190 may interface with analysis subsystem 156 for using the event detection algorithms configured through analytics manager 190 to process video data received by network video recorder 130 and/or selecting, training, and managing those algorithms.

Figure 2A:
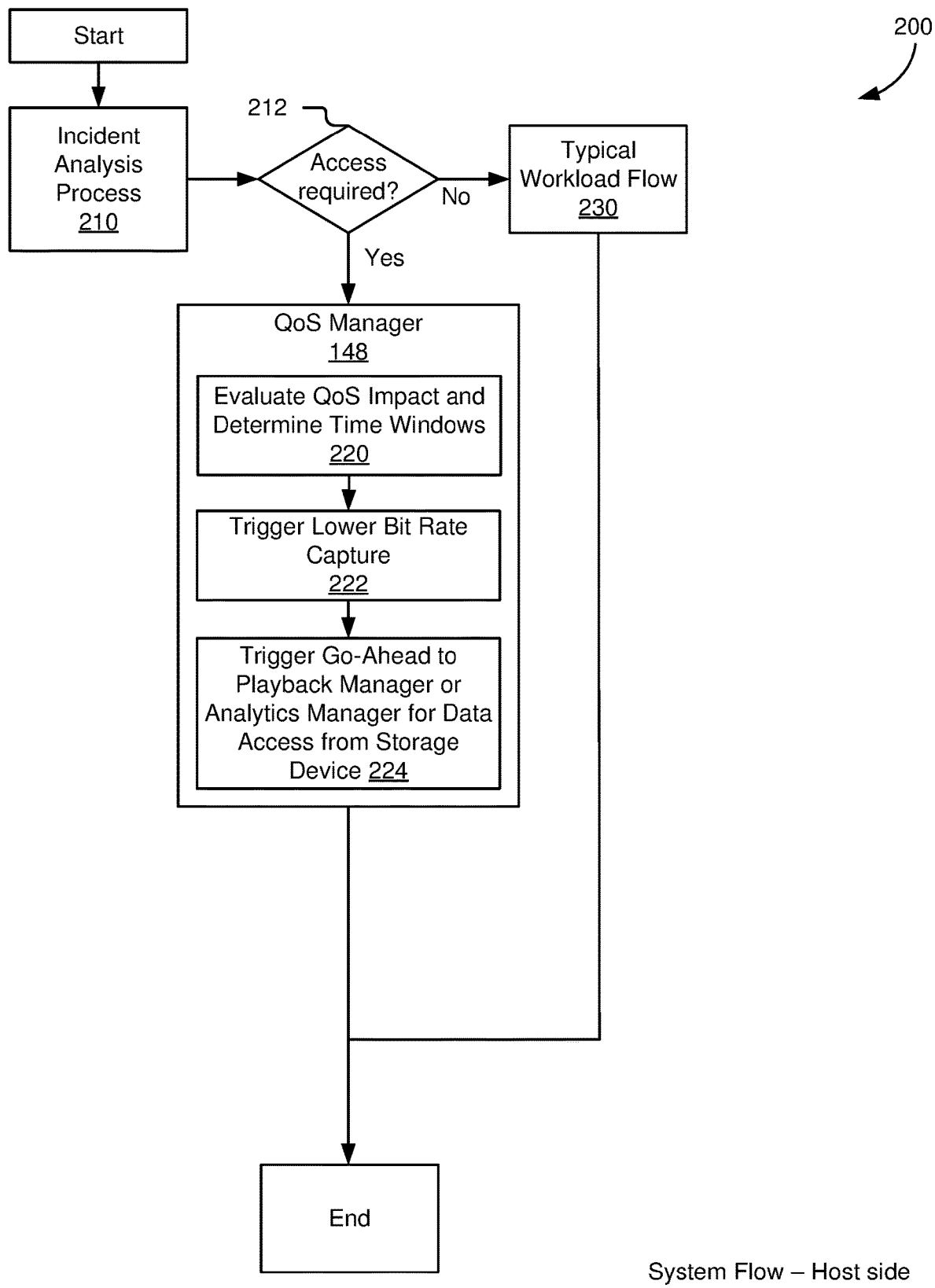
FIGS. 2A and 2B schematically illustrate workload triggered dynamic capture that may be used by the computer-based surveillance system of FIG. 1.

FIG. 2A shows a schematic representation of workload triggered dynamic capture, from a host side, that may be implemented in a computer-based surveillance system, such as surveillance system 100 in FIG. 1. Here, the host is a network video recorder (NVR), in an embodiment. An incident analysis process 210 is initiated. At block 212, a decision of whether access is required may be determined. For example, the incident analysis process 210 may include a request for playback of video data that has been stored at a storage device. As another example, the request for access to the storage device may involve internal storage analytics, such as when the NAND dies are occupied with computational workload for in-house analytics, an internal storage workload. If access is required, then data retrieval of the video data would be necessary and a quality of service (QoS) Manager 148 would be activated. If access is not required, then a typical workload flow 230 may be executed. For example, a typical workload flow 230 may be executing data capture and data writes according to standard operating procedures. Surveillance storage devices are well tuned for a standard write bit rate, for continuous operation.

A QoS Manager 148 may evaluate 220 a QoS impact and determine time windows based on the access request. For example, the QoS impact may be evaluated based a QoS impact received from the device (see FIG. 2B), which calculates the impact on the write data rate based on the amount of time needed to retrieve the requested video data for access. As a result, the QoS impact, is generated based on the anticipated workload. To avoid data loss, a temporary and controlled QoS drop leverages the known system requirements. Thus, the calculated QoS impact may be evaluated at the QoS Manager 148. Time windows may be determined based on the evaluated QoS impact. For example, an amount of time during which a QoS impact is performed at capture points, such as cameras, may be determined based on the amount of time needed for data retrieval for the access request. In an embodiment, it may take 0.5 seconds for reading 1 megabyte (MB) of data. As a result, the write bit rate may be adjusted based on a predetermined agreement with the storage device, in an embodiment.

The QoS Manager 148 may then trigger 222 a lower bit rate capture at a camera based on the access request. A lower bit rate capture at a camera will reduce write data rates during the retrieval request to the storage device. In one embodiment, the QoS Manager 148 explicitly and proactively triggers reduced write data rates during retrieval request to the storage device. For example, a managed table or model may be established such that an amount of time determined for the data retrieval based on the dies, flash channels, and controller speed, may be each associated with a specified write data rate. Thus, the static write data rate may be triggered 222. In another embodiment, the QoS Manager 148 triggers write data rate (QoS) adjustment based on feedback from the device. As a result, a write data rate is computed at runtime based on the feedback from the device. In other embodiments, the device may further rearrange the workload to manage the additional playback requirements prior to sending the impact factor. For example, the device may rearrange background activities, enhanced post-write read (EPWR) activities, and other device associated activities. Thus, the workload triggered capture rate may supersede the typical rate determined by the capture points in variable rate systems. This method involves slowing down the data generation rate at a capture source, thereby enabling the low cost surveillance storage to have a system design without hardware wastage for simultaneously handling playbacks of slightly longer duration without throttling the writes, advantageously avoiding data drop outs.

The QoS Manager 148 may then trigger 224 a go-ahead signal to playback manager or analytics manager for data access from storage device. In this way, the QoS Manager 148 initiates the data retrieval from the storage device after the lower bit rate capture at the camera is triggered 222. In some configurations, the playback manager and/or analytics manager may suspend or delay the data access and subsequent processing for display or analysis until the go-ahead signal is received from QoS manager 148.

Figure 2B:
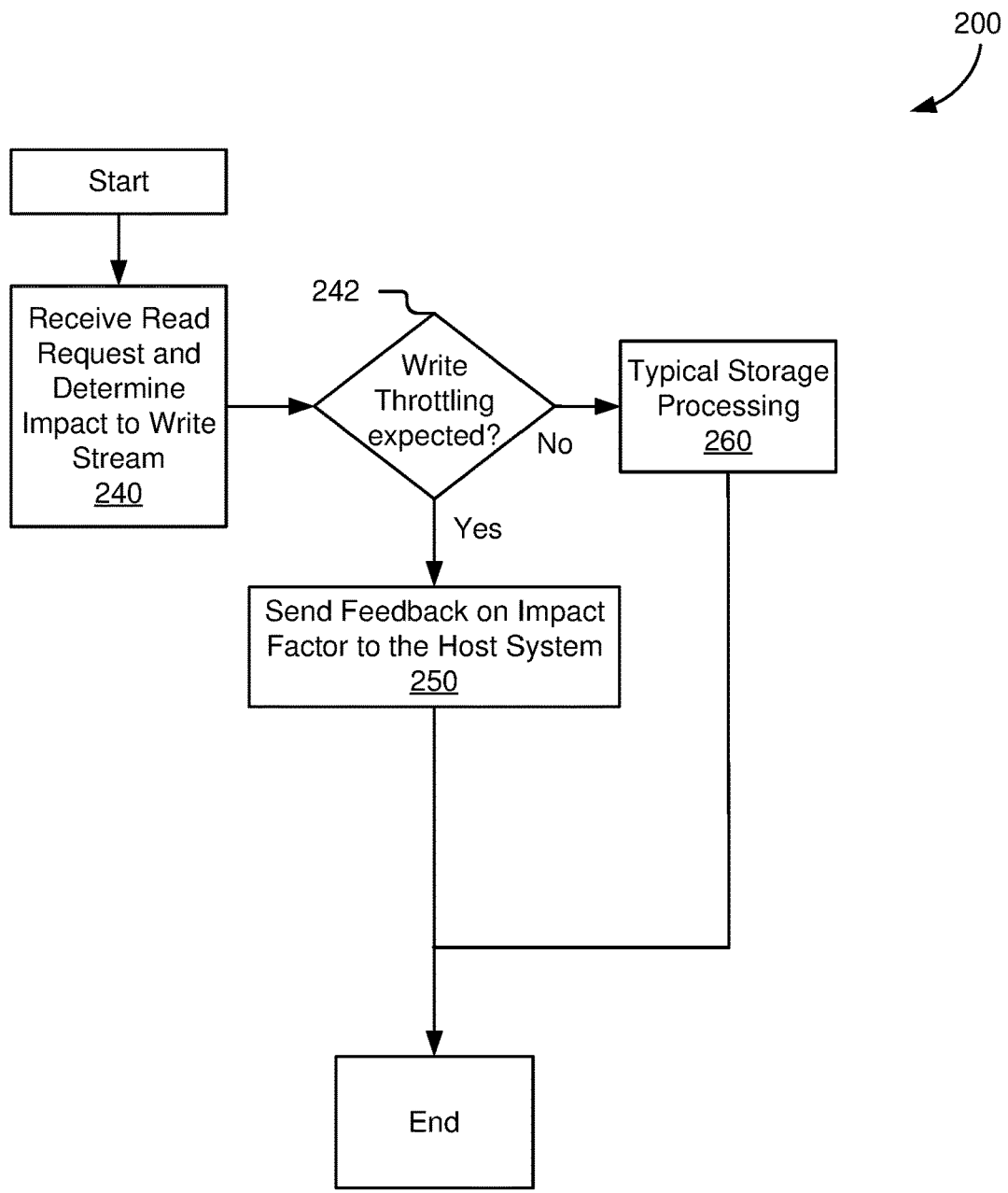

FIG. 2B similarly shows a schematic representation of playback workload triggered dynamic capture, from a device side, that may be implemented in a computer-based surveillance system, such as surveillance system 100 in FIG. 1. The device, here, is a storage device. A read request is received 240 based on an access request to the host and an impact to the write stream is determined. The impact may be determined based on the amount of time needed to retrieve the requested video data for playback or analysis. As a result, a calculated QoS drop, or QoS impact, may be generated based on the anticipated playback workload. To avoid data loss, a temporary and controlled QoS drop leverages the known system requirements and the available resources of the storage device.

At block 242, a decision of whether write throttling is expected may be determined. For example, the storage device may use one or more queues of host storage operations (pending read and/or write tasks), compute operations (such as function processing, search, or data transformation), and/or background operations (garbage collection, wear leveling, etc.) and a storage device resource model to determine an expected impact of the new read request. If no write throttling is expected based on the read request and the impact to the write stream, then typical storage processing 260 is executed. If write throttling is expected, based on the read request and the impact to the write stream, then feedback on impact factor is sent 250 to the host system. The feedback on the impact factor may include the determined impact to the write stream, in an embodiment.

Figure 3:
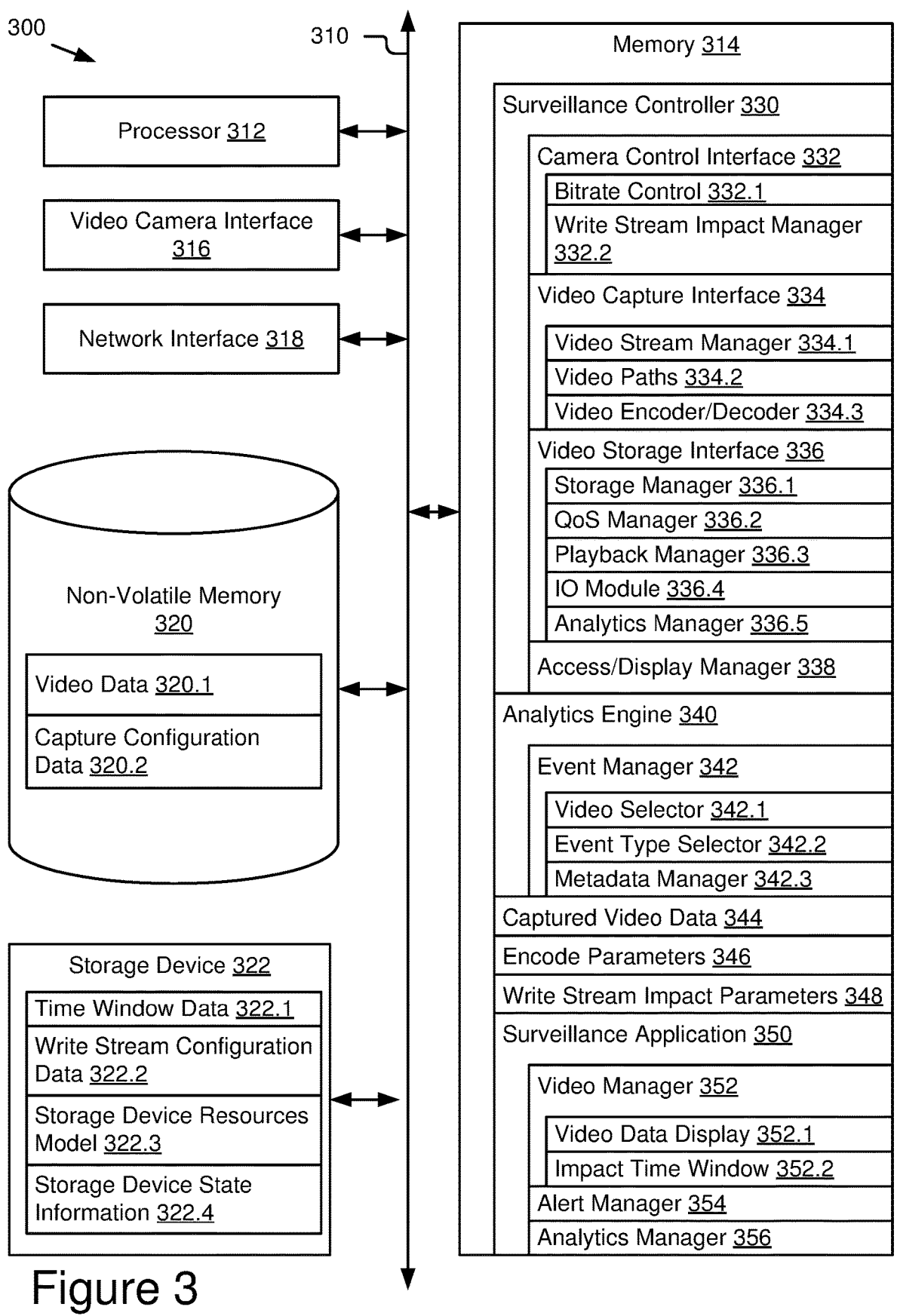
FIG. 3 schematically illustrates some elements of the computer-based surveillance system of FIG. 1.

FIG. 3 schematically shows selected modules of a surveillance system 300 configured for playback workload triggered dynamic capture. Surveillance system 300 may incorporate elements and configurations similar to those shown in FIGS. 1-2. For example, surveillance system 300 may be configured in a network video recorder similar to network video recorder 130. In some embodiments, one or more of the selected modules may access or be instantiated in the processors, memories, and other resources of video cameras configured for video capture, similar to video cameras 110, and/or user devices configured for video monitoring, similar to user device 170.

Surveillance system 300 may include a bus 310 interconnecting at least one processor 312, at least one memory 314, and at least one interface, such as video camera interface 316 and network interface 318. Bus 310 may include one or more conductors that permit communication among the components of surveillance system 300. Processor 312 may include any type of processor or microprocessor that interprets and executes instructions or operations. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element.

Video camera interface 316 may be configured for connection with one or more video cameras. For example, video camera interface 316 may include a plurality of ethernet ports and supporting protocols compatible with PoE standards for connecting to a plurality of cameras. In some embodiments, video camera interface 316 may include a PoE network switch for providing power to connected cameras and routing data packets to and from connected cameras, such as control and video data.

Network interface 318 may include one or more wired or wireless network connections to network, similar to network 102. Network interface 318 may include a physical interface, such as an ethernet port, and related hardware and software protocols for communication over the network, such as a network interface card or wireless adapter.

Surveillance system 300 may include one or more non-volatile memory devices 320 configured to store video data. For example, non-volatile memory devices 320 may include a plurality of flash memory packages organized as an addressable memory array and/or one or more solid state drives or hard disk drives. In some embodiments, non-volatile memory devices 320 may include a plurality of storage devices within, attached to, or accessible by a network video recorder for storing and accessing video data. Non-volatile memory devices 320 may include video data 320.1 and capture configuration data 320.2, in an embodiment. For example, video data 320.1 may be captured video data that is stored in non-volatile memory devices 320. Additionally, capture configuration data 320.2 may be the specified capture configuration that is requested to implement at least one mitigation option. For example, to compensate for the QoS impact of a playback request, capture configuration data 320.2 may include the configuration of camera data capture to capture at a lower resolution, lower frame rate, modified video encoding format, modified codec, modified video profile, group of pictures, and the like.

Surveillance system 300 may also include a storage device 322 configured to store video data. The storage device 322 may be an example of a non-volatile memory device 320, illustrated here to show various data determining a state of the storage device 322, such as storage device resources model 322.3, and storage device state information 322.4, in an embodiment. For example, a storage device resources model 322.3 may use storage device state information 322.4, such as health, temperature, garbage collection (GC) workload, and available capacity, in determining an impact on the QoS of a playback request. Additionally, other data may be stored on the storage device 322, including time window data 322.1 and write stream configuration data 322.2.

Surveillance system 300 may include a plurality of modules or subsystems that are stored and/or instantiated in memory 314 for execution by processor 312 as instructions or operations. For example, memory 314 may include a surveillance controller 330 configured to control a plurality of video cameras, capture and store video streams from those cameras, and enable user access, such as through surveillance application 350. Memory 314 may include an analytics engine configured to analyze video data to detect events for use by surveillance controller 330 and/or surveillance application 350. Memory 314 may include a surveillance application configured to provide a user interface for monitoring, reviewing, and managing surveillance video and/or surveillance system 300.

Surveillance controller 330 may include interface protocols, functions, parameters, and data structures for connecting to and controlling cameras, capturing and storing video data from those cameras, and interfacing with analytics engine 340 and surveillance application 350. For example, surveillance controller 330 may be an embedded firmware application and corresponding hardware in a network video recorder configured for network and/or direct communication with a set of associated video cameras. Surveillance controller 330 may be configured as a central collection point for video streams from the associated video cameras that enables analysis of captured video data by analytics engine 340 and presentation of video streams and video event alerts to a user through surveillance application 350.

In some embodiments, surveillance controller 330 may include a plurality of hardware and/or software modules configured to use processor 312 and memory 314 to handle or manage defined operations of surveillance controller 330. For example, surveillance controller 330 may include a camera control interface 332, a video capture interface 334, a video storage interface 336, and an access and display manager 338.

Camera control interface 332 may include camera interface protocols and a set of functions, parameters, and data structures for using, configuring, communicating with, and providing command messages to cameras through video camera interface 316 and/or network interface 318. For example, camera control interface 332 may include an API and command set for interacting with control circuit in each camera to access one or more camera functions. In some embodiments, camera control interface 332 may be configured to set video configuration parameters for camera image sensors, microphones, and/or video encoders, access pan-tilt-zoom features, set or modify camera-based motion detection, tripwire, and/or low light detection parameters, and/or otherwise manage operation of cameras. For example, camera control interface 332 may maintain a video camera configuration table, pages, or similar data structures that includes entries for each video camera being managed and their respective camera-specific configuration parameters, active control features (such as PTZ control), and other configuration and control information for managing the cameras. In some embodiments, each camera may be assigned a unique camera identifier that may be used by surveillance controller 330, analytics engine 340, and/or surveillance application 350 to associate video data with the camera from which it was received.

In some embodiments, camera control interface 332 may include control signals, commands, or messages for manipulating specific features of one or more cameras. For example, camera control interface 332 may include a control signal for bitrate control 332.1. In some embodiments, bitrate control 332.1 may include an API and corresponding logic for enabling and/or disabling lower bitrates by sending command messages or signals to the camera. In some embodiments, camera control interface 332 may include a write stream impact manager 332.2 configured to determine an impact to a write stream based on received requests for playback of video data. For example, the impact to the write stream may be determined from a managed table or model that determines, based on a size of video data being requested for playback, a read time from the storage device for the retrieval of the video data and the corresponding impact to the write stream. In some embodiments, bitrate control 332.1 may send at least one mitigation option to the camera responsive to the write stream impact manager 332.2 determining an impact to the write stream. Different mitigation options include changing the video resolution of the video camera (e.g., 4K resolution reduced to 2K resolution, 2K resolution reduced to 1K, 1K reduced to 720p, and so forth), reducing the frame rate (e.g., 60 frames per second reduced to 30 frames per second, 30 frames per second reduced to 20 frames per second, and so forth), reducing a frame size, reducing the group of pictures (GOP), changing or modifying an encoding format, changing or modifying a codec, changing or modifying a video profile, and so forth.

Video capture interface 334 may include camera interface protocols and a set of functions, parameters, and data structures for receiving video streams from associated cameras. For example, video capture interface 334 may include video data channels and related data buffers for managing a plurality of camera video data streams. In some embodiments, each video camera may be allocated a dedicated video channel for continuously and/or selectively sending its video stream to video capture interface 334. Video capture interface 334 may be configured to pass each received video stream to video storage interface 336, analytics engine 340, and/or access/display manager 338. For example, received video streams may be buffered by video capture interface before being streamed to video storage interface 336 and split into dual video streams with different video parameters for analytics engine 340 and access/display manager 338. In some embodiments, video capture interface 334 may receive camera video metadata describing the camera video format, time and location information, and event or condition tags based on on-board camera analytics. Video capture interface 334 may generate additional video metadata for video format changes and provide video metadata to video storage interface 336 and/or other components.

In some embodiments, video capture interface 334 may include a video stream manager 336.1 configured to identify and manage the plurality of video streams being received from the cameras. For example, video stream manager 336.1 may manage video buffer allocation and space, processing of video streams from a camera video format to another video format, flushing of buffered video to storage through video storage interface 336 and/or for display via access/display manager 338. In some embodiments, video stream manager 336.1 may send video streams to analytics engine 340 for analysis and/or provide a notification to analytics engine 340 of the availability and storage location of video data for analysis in non-volatile memory 320 (as determined by video storage interface 336). In some embodiments, video stream manager 334.1 may include configurable video paths 334.2. For example, the storage path (through video storage interface 336), the display path (through access/display manager 338), and/or the analytics path (through analytics engine 340) may each be configured for specific processing, priority, and timing. In some embodiments, video stream manager 334.1 may be configured to use encoder/decoder 334.3 to decode camera video streams in a first (camera) video format and re-encode them in one or more other formats. For example, video stream manager 334.1 may use encoder/decoder 334.2 to change the resolution, image size, frame rate, codec, compression factor, color/gray-scale, or other video format parameters. In some embodiments, a different video stream format may be configured for each video path 334.2. For example, a full spectrum color video stream may be processed through the storage and/or analytics path, while a full spectrum gray scale video stream may be processed through the display path.

Video storage interface 336 may include storage interface protocols and a set of functions, parameters, and data structures for managing storage of video data in non-volatile memory 320, such as storage devices and/or network video storage, for later retrieval and use by access/display manager 338 and/or analytics engine 340. For example, video storage interface 336 may write camera video stream data from video data buffers and/or storage path video data from video capture interface 334 to non-volatile memory 320. In some embodiments, video storage interface 336 may include a storage manager 336.1 configured to manage video storage space in non-volatile memory 320 in accordance with one or more data retention and/or data archiving schemes. For example, surveillance system 300 may support continuous and/or triggered recording of video data from associated cameras and storage manager 336.1 may include logic for enforcing a data retention and overwriting policy whereby the fixed storage space of non-volatile memory 320 is recycled for storing a recent period of captured video, video data meeting specific retention criteria, and/or deleting or archiving video data after one or more periods of time defined in the data retention policy. Video storage interface 336 may also receive and store video metadata 320.4 as tags or metadata tracks in the video data or in an associated metadata table, file, or similar data structure associated with the corresponding video data objects.

In some embodiments, video storage interface 336 may be configured to store video data at different write rates. Mitigation options for simultaneously writing data while executing a read request may include rearranging background activities for the storage device, such as enhanced post-write read (EPWR) activities. For example, background activities may be rearranged or eliminated completely to manage the additional playback requirements prior to sending the impact factor. Additionally, the video storage interface 336 may be configured to store video data at a storage device 322, which may be separate and apart from non-volatile memory devices 320. In some embodiments, storage manager 336.1 assigns or receives storage locations for stored video data and provides the storage locations corresponding to the different video paths to the respective consumer components. For example, QoS Manager 336.2 may determine the QoS impact of an access request, as described above, and a playback manager 336.3 or an analytics manager 336.5 may be tasked with executing an access request based on the go-ahead given by the QoS Manager 336.2. Playback manager 336.3 may receive a playback request, such as through access/display manager 338, and generate one or more read commands to one or more storage devices, providing the resulting video data to access/display manager 338. Analytics manager 336.5 may receive an analytics request, such as from analytics engine 340 and/or analytics manager 356 in surveillance application 350, and generate one or more read commands to one or more storage devices, providing the results to the requesting component. In some configurations, storage devices may include onboard analytics processing capabilities that may be accessed by analytics manager 336.5 and use memory and/or processing resources of the storage device beyond the read operations for retrieving the video data. The video storage interface 336 may also include an input/output (TO) module 336.4 that manages requests for access to the storage device, including reads and writes.

Access/display manager 338 may include APIs and a set of functions, parameters, and data structures for displaying video from video capture interface 334 and/or video storage interface 336 to a user display application, such as surveillance application 350. For example, access/display manager 338 may include a monitoring or display configuration for displaying one or more video streams in real-time or near real-time on a graphical user display of a user device and/or receive video navigation commands from the user device to selectively display stored video data from non-volatile memory 320. In some embodiments, access/display manager 338 may maintain an index of real-time/near real-time video streams and/or stored or archived video streams that are available for access by surveillance application 350. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Access/display manager 338 may be configured to support surveillance application 350 when instantiated in the same computing device as surveillance controller 330, directly attached to the computing device hosting surveillance controller 330, and/or via a network within a LAN, WAN, VPN, or the internet. In some embodiments, access/display manager 338 may provide selective access to user video format 336.2 and/or video streams allocated by video capture interface 334 to the user video path. For example, access/display manager 338 may serve the user video stream to surveillance application 350 with IR filtered color video for normal light conditions and gray scale video for low light conditions.

Analytics engine 340 may include interface protocols, functions, parameters, and data structures for analyzing video data to detect video events, add them to video metadata, and/or raise alerts, such as through surveillance application 350. For example, analytics engine 340 may be an embedded firmware application and corresponding hardware in a network video recorder configured for local analysis of video data captured from associated video cameras and may be integral to or accessible by surveillance controller 330. In some embodiments, analytics engine 340 may run on a separate computing device from surveillance controller 330, such as a video camera with analytics capabilities, a dedicated analytics appliance, data storage system with analytics capabilities, or a cloud-based analytics service. In some embodiments, analytics engine 340 may operate in real-time or near real-time on video data received by video capture interface 334, delayed processing of video data stored by video storage interface 336, and/or a combination thereof based on the nature (and processing requirements) of the video events, volume of video to be processed, and other factors. In some embodiments, surveillance system 200 may comprise a plurality of analytics engines configured for a particular type of event and corresponding event detection algorithm or model.

In some embodiments, analytics engine 340 may include a plurality of hardware and/or software modules configured to use processor 312 and memory 314 to handle or manage defined operations of analytics engine 340. For example, analytics engine 340 may include an event manager 342, an analytical model library, and a training service. Analytics engine 340 may be configured to run one or more event detection algorithms for determining, tagging, and/or initiating alerts or other actions in response to detected video events. In some embodiments, analytics engine 340 may be configured to tag or build metadata structures that map detected events to time and image location markers for the video stream from which they are detected. For example, analytics engine 340 may use motion, tripwire, object recognition, facial recognition, audio detection, speech recognition, and/or other algorithms to determine events occurring in a video stream and tag them in a corresponding metadata track and/or separate metadata table associated with the video data object.

Event manager 342 may include storage interface and/or buffer interface protocols and a set of functions, parameters, and data structures for processing target video streams for predefined event types and updating or adding metadata parameters describing the detected video events. For example, event manager 342 may be configured to process all incoming video streams for surveillance controller 330 and/or selectively process video data based on user selections (through surveillance application 350) or metadata criteria received from the video camera or video capture interface 334. In some embodiments, event manager 342 may include a video selector 342.1 configured to select target video streams or video data sets for analysis. For example, video selector 342.1 may identify a real-time video stream for near real time analysis or a bounded video data set, such as video with a specified camera identifier and timestamps between beginning and ending time markers and/or including a defined set of metadata parameters. Event manager 342 may include an event type selector 342.2 configured to determine one or more event types to be detected from the selected video data. For example, an analytics configuration may be configured to analyze the selected video stream for a predefined set of motion detection, tripwire detection, object recognition, facial recognition, audio detection, speech recognition, and/or similar video event types. Each event type may map or correspond to an analytical model type, set of parameters, and one or more model weights for defining an event detection algorithm stored in the analytical model library for use by analytics engine 340 to detect potential video events. In some embodiments, event manager 342 may include detected event handling logic for determining response to detection of one or more detected events. For example, a metadata manager 342.3 may add one or more detected event tags to video data 320.1 and/or send an alert or notification to access/display manager 338 for communication to surveillance application 350.

Captured video data 344 may be instantiated and/or stored in memory 314 for use by the modules described herein before being stored at the storage device 322 or non-volatile memory devices 320. Additionally, encode parameters 346 may be generated and similarly instantiated and/or stored in memory 314 for use by the modules described herein before being sent to the video camera interface for execution. The encode parameters 346 may include different resolution sizes, frame rates, group of pictures values, and other values associated with mitigation options to lower the data capture rate at capture points. Further, write stream impact parameters 348 may be received from a storage device 322 and similarly instantiated and/or stored in memory 314 for use by the modules described herein before being used by the write stream impact manager 332.2 to determine a mitigation option.

Surveillance application 350 may include interface protocols, functions, parameters, and data structures for providing a user interface for monitoring and reviewing surveillance video and/or managing surveillance system 300, such as through surveillance controller 330. For example, surveillance application 350 may be a software application running on a user device integral to, connected to, or in network communication with surveillance controller 330 and/or a hosting network video recorder. In some embodiments, surveillance application 350 may run on a separate computing device from surveillance controller 330, such as a personal computer, mobile device, or other user device. In some embodiments, surveillance application 350 may be configured to interact with APIs presented by access/display manager 338.

In some embodiments, surveillance application 350 may include a plurality of hardware and/or software modules configured to use processor 312 and memory 314 to handle or manage defined operations of surveillance application 350. For example, surveillance application 350 may include a video manager 352, an alert manager 354, and an analytics manager 356.

Video manager 352 may include APIs and a set of functions, parameters, and data structures for navigating and displaying video streams from video cameras accessed through surveillance controller 330. For example, video manager 352 may include a graphical user interface and interactive controls for displaying lists, tables, thumbnails, or similar interface elements for selecting and displaying video streams for particular cameras, times, locations, and/or events. In some embodiments, video manager 352 may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, video manager 352 may include a data structure summarizing all video data stored in surveillance system 300 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.).

In some embodiments, video manager 352 may be configured to provide video display 352.1 on the graphical user interface of the user device based on a playback request. For example, video manager 352 may receive a video stream from access/display manager 338 as part of a display path when the video as captured. In some embodiments, video manager 352 may receive an impact time window 352.2 that indicates a determined time window where data capture is impacted based on a playback request.

Alert manager 354 may include APIs and a set of functions, parameters, and data structures for setting, monitoring, and displaying alerts based on detected video events. For example, the user may define a set of trigger events that generate visual, audible, tactile, and/or notification-based (electronic mail, text message, automated call, etc.) alerts to a user device. In some embodiments, alert manager 354 may include a plurality of preset alert conditions with associated event parameters and allow a user to enable and disable alert types and/or change associated event parameters.

Analytics manager 356 may include APIs and a set of functions, parameters, and data structures for selecting, training, and managing event detection algorithms. For example, analytics manager 356 may include a user interface to an analytical model library for one or more analytics engines 340. In some embodiments, the event detection algorithms may include a set of parameters and/or model weights that are preconfigured based on training data sets processed independent of surveillance system 300. For example, analytics manager 356 may include object detection algorithms for common objects, situations, and camera configurations. In some embodiments, analytics manager 356 may include access to the training service and/or preconfigured training data sets. For example, analytics manager 356 may enable the user to define training data sets for determining or refining event detection algorithm parameters and/or model weights based on predefined base algorithms or models. In some embodiments, analytics manager 356 may interface directly with analytics engine 340 for selecting, training, managing, and using the event detection algorithms configured through analytics manager 356. In some embodiments, analytics manager 356 may interface with access/display manager 338 for accessing and managing one or more analytics engines 340.

Figure 4:
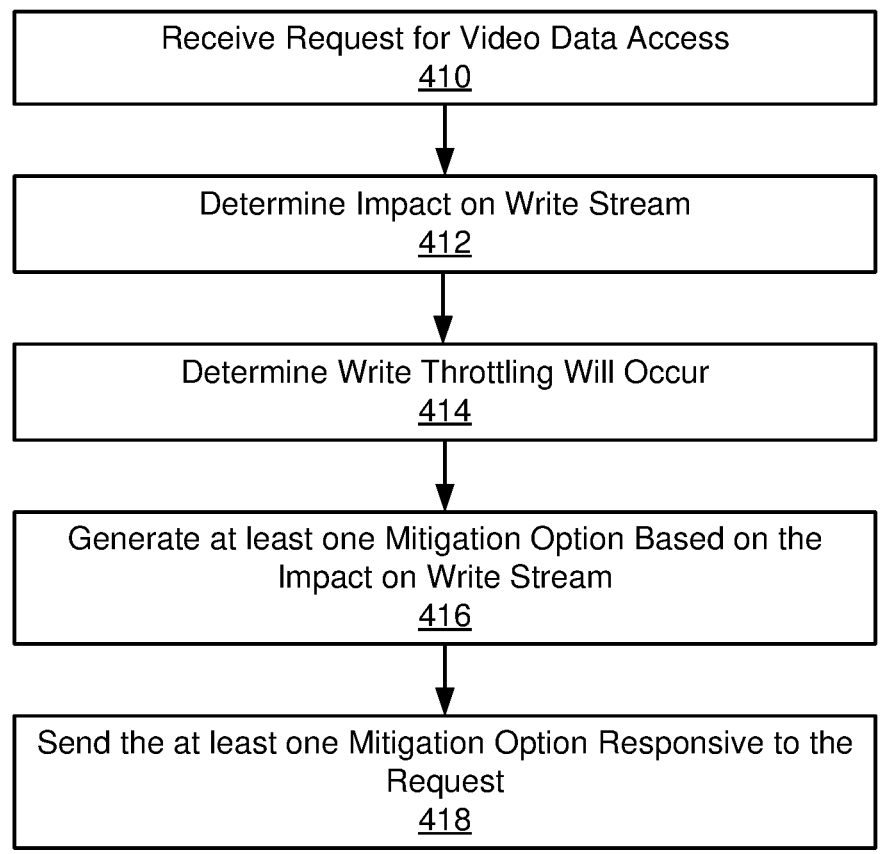
FIG. 4 is a flowchart of an example method of dynamically capturing video based on workload.

As shown in FIG. 4, surveillance system 300 may be operated according to an example method for dynamically capturing video based on workload, i.e., according to method 400 illustrated by blocks 410-418 in FIG. 4.

At block 410, a request for video data access may be received. For example, a request to access a storage device may be received, such as a playback request of captured video data or an internal storage analytics request requiring access to the storage device.

At block 412, an impact on the write stream may be determined. For example, the write stream may be affected by the amount of time needed for data retrieval of the video data from the storage device based on the access request. An impact on the write stream may be determined based on the amount of time, as determined by a managed table or model that indicates an impact on the write stream based on the amount of time spent on the access request.

At block 414, it is determined that write throttling will occur based on the determined impact on the write stream. For example, write throttling is a way of handling a workload where data loss may happen. Because write throttling is to be avoided, the determination that write throttling will occur based on the determined impact on the write stream is a cause to identify at least one mitigation option based on the impact on the write stream.

At block 416, at least one mitigation option is generated based on the impact on the write stream. For example, a frame rate may be reduced at a capture point. In another embodiment, a video capture resolution may be reduced. In a further embodiment, a frame size may be reduced. Yet, in a further embodiment, a group of pictures may be reduced. In some embodiments, background activities may be rearranged to reduce the write bit rate, such as modifying enhanced post-write read (EPWR) activities.

At block 418, the at least one mitigation option is sent to a storage manager. For example, the at least one mitigation option of reducing video resolution size may be sent to a storage manager such that the data capture is stored using the lower resolution size.

Figure 5:
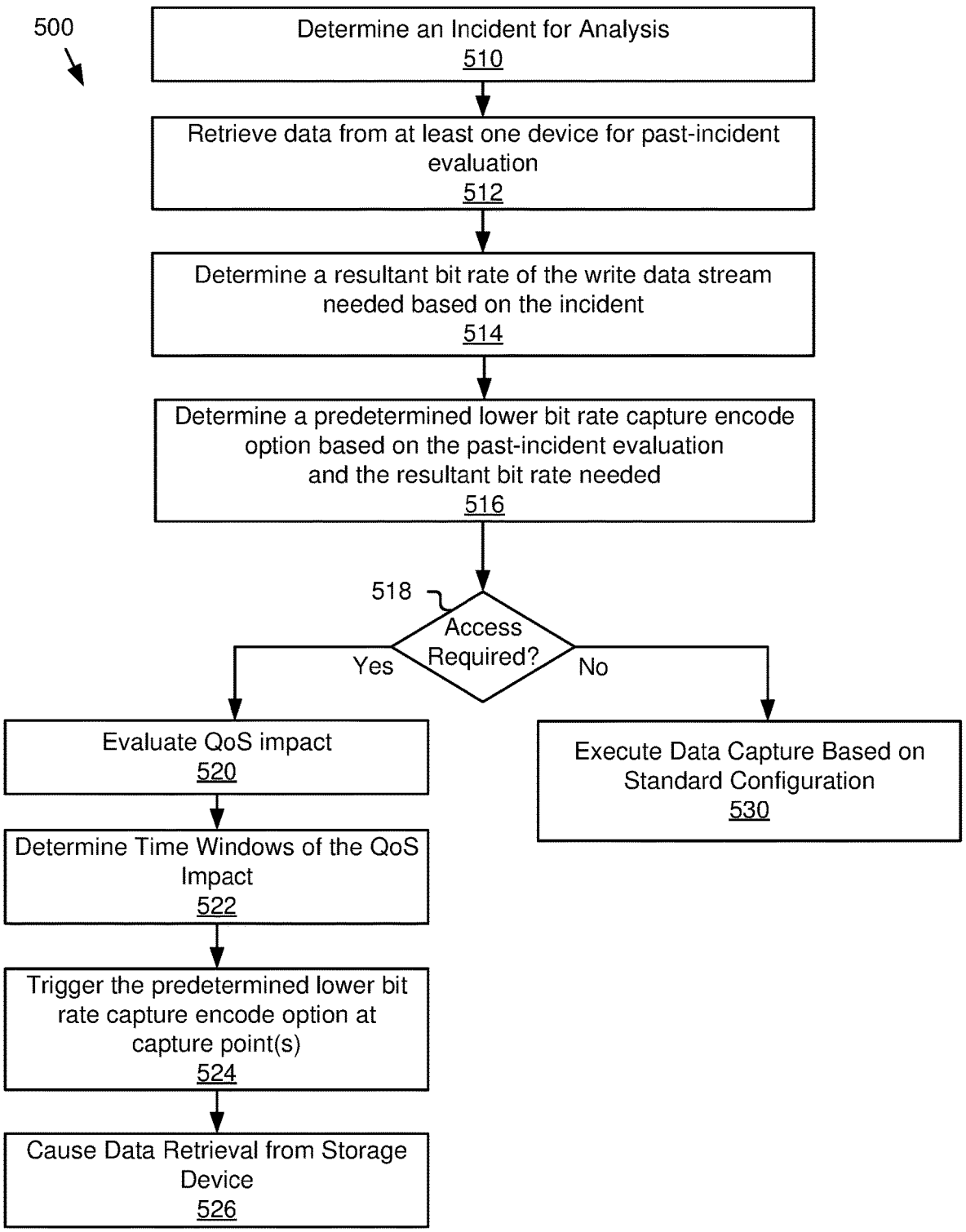
FIG. 5 is a flowchart of an example method of separately determining a mitigation option.

As shown in FIG. 5, surveillance system 300 may be operated according to an example method for separately determining a mitigation option, i.e., according to method 500 illustrated by blocks 510-530 in FIG. 5.

At block 510, an incident may be determined for analysis. For example, a user of the surveillance system may determine that an incident that has been recorded be selected for analysis.

At block 512, data from at least one device is retrieved for past-incident evaluation. For example, data from a device associated with a past incident may be retrieved for evaluation.

At block 514, a resultant bit rate of the write data stream that is needed is determined based on the incident. For example, the past incident may be a large file, such as 10 MB, where read access is needed at 0.5 seconds per MB. Thus, a resultant bit rate of the write data stream could be looked up in a managed table or model where the time window is 5 seconds. As an example, the resultant bit rate of the write data stream needed may be 100 KB per second based on the time window of 5 seconds.

At block 516, a predetermined lower bit rate capture encode option is determined based on the past-incident evaluation and the resultant bit rate needed. In one embodiment, a predetermined lower bit rate capture encode option has been configured at a storage device from a plurality of mitigation options. The plurality of mitigation options may include a lower video resolution, a lower frame rate, a lower group of pictures values, a lower frame size, and a rearrangement of background activities on the storage device, such as enhanced post-write read (EPWR) activities.

At block 518, whether access is required may be determined. For example, the video camera may receive a request for incident analysis that does not require playback. If access is required, method 500 may proceed to block 520 for QoS Impact mitigation. If access is not required, method 500 may proceed to block 530 for executing data capture based on a standard configuration.

At block 520, an impact on QoS is evaluated. For example, the video camera may be configured to generate a QoS impact and deliver the calculated QoS drop needed.

At block 522, time windows of the QoS impact are determined. For example, an amount of time is determined for each part of the read process that impacts the write stream, such as the device controller, the interface controller, and the individual dies being addressed (by reads and writes), in an embodiment. In some embodiments, the time windows of the QoS impact are determined based on the impact to the storage device, processor, memory, and data channel resources.

At block 524, the predetermined lower bit rate capture encode option is triggered at capture point(s). For example, the surveillance controller may command the camera control interface to start using the predetermined lower bit rate capture encode option. Where there are multiple capture points that require access, each capture point may be issued the same command to start using the predetermined lower bit rate capture encode option.

At block 526, the requested data from the storage device is caused to be retrieved. For example, the playback manager may cause a command to retrieve the requested data via the video storage interface. As another example, the analytics manager may cause a command to access the requested data via the video storage device.

At block 530, data capture is executed based on standard configuration. For example, when no access is required, data capture is not affected and is executed based on standard configuration.

Figure 6:
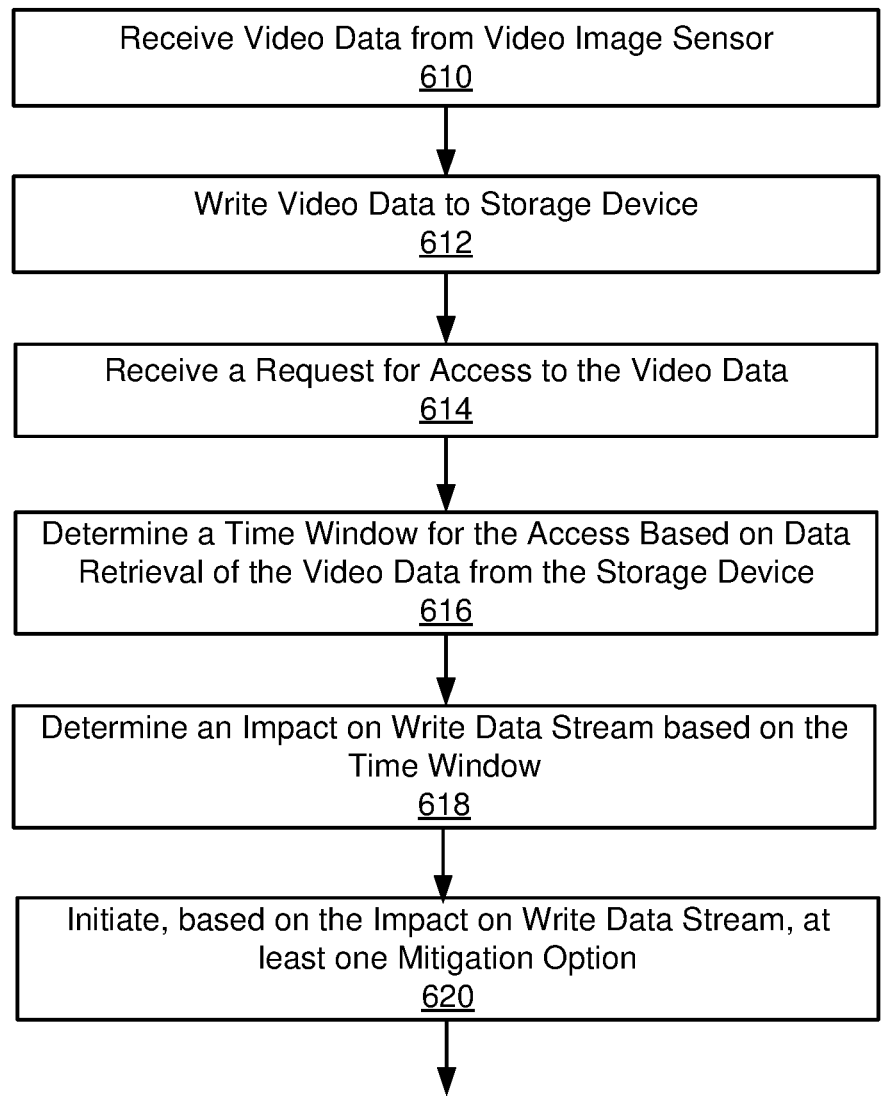
FIG. 6 is a flowchart of an example method of workload triggered dynamic capture.

As shown in FIG. 6, surveillance system 300 may be operated according to an example method for workload triggered dynamic capture, i.e., according to method 600 illustrated by blocks 610-618 in FIG. 6.

At block 610, video data is received from a video image sensor. For example, a camera in the surveillance system receives video data.

At block 612, video data is written to a storage device. For example, the video data that is captured is stored and written to a storage device.

At block 614, a request for access to the video data may be received. For example, the surveillance application may receive a request to retrieve the selected video stream segment from stored or streaming video data managed by a surveillance controller. As another example, internal storage analytics processes may request access to the storage device.

At block 616, a time window for the access is determined based on data retrieval of the video data from the storage device. For example, the video stream segment requested at block 614 may be determined to have a time window for the playback. As another example, the requested access at block 614 may be determined to have a time window for the access.

At block 618, an impact on write data stream is determined based on the time window. For example, based on the time window, an impact on the write data stream can be calculated from a managed table or model on the impact on resources of the storage device, such as storage device processor, memory, and/or data channel resources.

At block 620, at least one mitigation option, based on the impact on write data stream, may be initiated. For example, the surveillance controller may command via the camera control interface that the camera initiate at least one mitigation option, such as reduced video resolution, reduced frame rate, reduced frame size, reduced group of pictures, and/or rearranging background storage activities, such as enhanced post-write read (EPWR) activities.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
 a video image sensor; and
 a surveillance controller configured to:
  receive video data from the video image sensor, wherein the video data includes a video stream of video frames captured by the video image sensor;
  write the video data to a storage device;
  receive a request for access to the video data;
  determine a time window for the access to the video data based on a data retrieval of the video data from the storage device;
  determine an impact on a standard data write stream based on the time window; and
  initiate, based on the impact on the standard data write stream, at least one mitigation option at the video image sensor.

2. The system of claim 1, wherein the surveillance controller is further configured to:
 retrieve a plurality of capture encode options based on past incidents having data write stream impacts; and
 determine the at least one mitigation option from the plurality of capture encode options based on the impact on the standard data write stream.

3. The system of claim 1, wherein:
 the storage device is one storage device of a plurality of storage devices embedded in a network video recorder (NVR);
 the NVR comprises the surveillance controller; and
 the surveillance controller is further configured to determine the impact on the standard data write stream to the storage device based on the plurality of storage devices embedded in the NVR.

4. The system of claim 1, wherein the surveillance controller is further configured to:
 determine, based on the at least one mitigation option, capture configuration data to lower a bit rate of the video data captured by the video image sensor; and
 reconfigure, during the time window and using the capture configuration data, video capture through the video image sensor.

5. The system of claim 1, wherein the at least one mitigation option comprises a capture encode option that lowers a resolution of the video frames captured by the video image sensor.

6. The system of claim 1, wherein the at least one mitigation option comprises a capture encode option that lowers a frame rate of the video frames captured by the video image sensor.

7. The system of claim 1, wherein the at least one mitigation option comprises modifying at least one capture encode parameter such that a resultant bit rate of a write data stream to the storage device is lowered.

8. The system of claim 7, wherein the at least one capture encode parameter is selected from:
 frame size;
 group of pictures;
 encoding format;
 codec; and
 video profile.

9. The system of claim 1, wherein the at least one mitigation option comprises modifying at least one capture encode parameter based on feedback on at least one state of other states of the storage device, the at least one state selected from:
 health;
 temperature;
 garbage collection workload; and
 capacity.

10. The system of claim 9, wherein the feedback is based on a storage device resources model that tracks information on storage device state information including at least one of:
 health;
 temperature;
 garbage collection workload; and
 available capacity.

11. The system of claim 1, wherein the at least one mitigation option comprises rearranging at least one activity on the system, the activity including background activity and enhanced post write read activity.

12. The system of claim 1, wherein the request for access to the video data comprises one of:
playback of the video data, or
execution of analytics involving access to the storage device.

13. The system of claim 1, further comprising
a video camera housing, wherein the video camera housing encloses:
the video image sensor;
the surveillance controller;
a network interface configured to communicate with a network; and
the storage device.

14. The system of claim 13, wherein:
the storage device is one storage device of a plurality of storage devices embedded in the video camera housing; and
the surveillance controller is further configured to determine the impact on the standard data write stream to the storage device based on the plurality of storage devices embedded in the video camera housing.

15. A computer-implemented method, comprising:
receiving video data from a video image sensor, wherein the video data includes a video stream of video frames captured by the video image sensor;
writing the video data to a storage device;
receiving a request for access to the video data;
determining a time window for the access to the video data based on a data retrieval of the video data from the storage device;
determining an impact on a standard data write stream based on the time window; and
initiating, based on the impact on the standard data write stream, at least one mitigation option at the video image sensor.

16. The computer-implemented method of claim 15, further comprising:
retrieving a plurality of capture encode options based on past incidents having data write stream impacts; and
determining the at least one mitigation option from the plurality of capture encode options based on the impact on the standard data write stream.

17. The computer-implemented method of claim 15, further comprising:
determining, based on the at least one mitigation option, capture configuration data to lower bit rate of the video data captured by the video image sensor; and
reconfiguring, during the time window and using the capture configuration data, video capture through the video image sensor.

18. The computer-implemented method of claim 15, wherein the at least one mitigation option is selected from:
lowering a resolution of the video frames captured by the video image sensor;
lowering a frame rate of the video frames captured by the video image sensor; and
modifying at least one capture encode parameter such that a resultant bit rate of a write data stream to the storage device is lowered.

19. The computer-implemented method of claim 15, wherein the at least one mitigation option comprises modifying at least one capture encode parameter such that a resultant bit rate of a write data stream to the storage device is lowered, the at least one capture encode parameter is selected from:
frame size;
group of pictures;
encoding format;
codec; and
video profile.

20. A video camera, comprising:
a video image sensor;
means for receiving video data from the video image sensor, wherein the video data includes a video stream of video frames captured by the video image sensor;
means for writing the video data to a storage device;
means for receiving a request for access to the video data;
means for determining a time window for the access to the video data based on a data retrieval of the video data from the storage device;
means for determining an impact on a standard data write stream based on the time window; and
means for initiating, based on the impact on the standard data write stream, at least one mitigation option at the video image sensor.

* * * * *